United States Patent
Wang et al.

(10) Patent No.: US 10,193,875 B2
(45) Date of Patent: Jan. 29, 2019

(54) METHOD AND APPARATUS FOR CONTROLLING ACCESS TO SURVEILLANCE VIDEO

(71) Applicant: Xiaomi Inc., Beijing (CN)

(72) Inventors: Wei Wang, Beijing (CN); Bo Zhang, Beijing (CN); Ziguang Gao, Beijing (CN); Mingjun Yin, Beijing (CN)

(73) Assignee: XIAOMI INC., Haidian District, Beijing ( * ) Notice: Subject to any disclaimer, the term of this patent is extended or adjusted under 35 U.S.C. 154(b) by 171 days.

(21) Appl. No.: 15/090,604

(22) Filed: Apr. 4, 2016

(65) Prior Publication Data

US 2016/0219032 A1  Jul. 28, 2016

Related U.S. Application Data

(63) Continuation of application No. PCT/CN2015/093860, filed on Nov. 5, 2015.

(30) Foreign Application Priority Data

Dec. 19, 2014  (CN) .......................... 2014 1 0804324

(51) Int. Cl.
*H04L 29/06* (2006.01)
*H04N 7/18* (2006.01)

(52) U.S. Cl.
CPC .......... *H04L 63/08* (2013.01); *H04L 63/0428* (2013.01); *H04L 63/10* (2013.01);
(Continued)

(58) Field of Classification Search
CPC .................... H04L 63/08; H04L 63/10
(Continued)

(56) References Cited

U.S. PATENT DOCUMENTS 5,509,074 A    4/1996  Choudhury et al.
7,792,295 B2 * 9/2010  Yokota ..................... H04N 7/18
                                                    380/210
(Continued)

FOREIGN PATENT DOCUMENTS

CN    1808972 A    7/2006
CN    1889426 A    1/2007
(Continued)

OTHER PUBLICATIONS

A. J. Menezes et al., "Handbook of Applied Cryptography", published in 1997, CRC Press Inc., pp. 285-287.
(Continued)

*Primary Examiner* — David J Pearson
(74) *Attorney, Agent, or Firm* — Jun He Law Offices P.C.; James J. Zhu (57) ABSTRACT

A method and an apparatus for controlling access to a surveillance video are provided. The method includes: acquiring from a user account a view request for viewing a surveillance video file, the view request including authorization information of the user account; performing an identity authentication on the user account according to the authorization information; and allowing a user with the user account to view the surveillance video file when the identity authentication is passed. The present disclosure is used to prohibit freely viewing the surveillance video file.

7 Claims, 8 Drawing Sheets

(52) U.S. Cl.
CPC ............. *H04L 63/102* (2013.01); *H04N 7/18* (2013.01); *H04N 7/183* (2013.01); *H04L 63/06* (2013.01)

(58) Field of Classification Search
USPC .......................................................... 726/4
See application file for complete search history.

(56) References Cited

U.S. PATENT DOCUMENTS

| | | | |
|---|---|---|---|
| 8,026,804 | B2 | 9/2011 | Wu et al. |
| 2002/0138442 | A1 | 9/2002 | Hori et al. |
| 2005/0111660 | A1* | 5/2005 | Hosoda .................... H04K 1/00 380/44 |
| 2005/0273822 | A1* | 12/2005 | Snell ................ H04N 7/17336 725/64 |
| 2006/0148454 | A1 | 7/2006 | Welch |
| 2006/0171453 | A1* | 8/2006 | Rohlfing .......... G08B 13/19632 375/240.01 |
| 2007/0289012 | A1 | 12/2007 | Baird |
| 2007/0296817 | A1* | 12/2007 | Ebrahimi ......... G08B 13/19667 348/161 |
| 2008/0198487 | A1* | 8/2008 | Lala Balaji ............ G11B 5/633 360/3 |
| 2008/0303903 | A1 | 12/2008 | Bentley et al. |
| 2008/0310636 | A1 | 12/2008 | Bennett |
| 2011/0057787 | A1* | 3/2011 | Wu ........................ G08B 25/14 340/506 |
| 2011/0107114 | A1 | 5/2011 | Chen et al. |
| 2012/0101623 | A1 | 4/2012 | Hwang et al. |
| 2012/0257062 | A1 | 10/2012 | Wang et al. |
| 2013/0004090 | A1* | 1/2013 | Kundu .................. G07F 19/207 382/232 |
| 2014/0105389 | A1* | 4/2014 | Jung ........................ H04L 9/08 380/200 |
| 2014/0185801 | A1* | 7/2014 | Wang .................... H04L 9/0662 380/200 |
| 2015/0012839 | A1* | 1/2015 | Xie ..................... G06F 9/44505 715/745 |

FOREIGN PATENT DOCUMENTS

| | | |
|---|---|---|
| CN | 101026822 A | 8/2007 |
| CN | 101192921 A | 6/2008 |
| CN | 101610148 A | 12/2009 |
| CN | 101951443 A | 1/2011 |
| CN | 102025977 A | 4/2011 |
| CN | 102055887 A | 5/2011 |
| CN | 102075544 A | 5/2011 |
| CN | 102186101 A | 9/2011 |
| CN | 102722671 A | 10/2012 |
| CN | 102724563 A | 10/2012 |
| CN | 103427998 A | 12/2013 |
| CN | 103532958 A | 1/2014 |
| CN | 103581622 A | 2/2014 |
| CN | 103746993 A | 4/2014 |
| CN | 104486083 A | 4/2015 |
| EP | 2958321 A1 | 12/2015 |
| JP | 1986177479 A | 8/1986 |
| JP | 1998269145 A | 10/1998 |
| JP | 2002099456 A | 4/2002 |
| JP | 2006031483 A | 2/2006 |
| JP | 2008125034 A | 5/2008 |
| JP | 2011130003 A | 6/2011 |
| KR | 20140137084 A | 12/2014 |
| RU | 2012101705 A | 7/2013 |
| WO | 03026305 A1 | 3/2003 |
| WO | 2014169828 A1 | 10/2014 |

OTHER PUBLICATIONS

Sung-Ryul Kim, "Copy Protection System for Android App using Public Key Infrastructure", vol. 9 Issue 1, Feb. 2012, Journal of Security Engineering, pp. 121-133.
International Search Report for PCT Application No. PCT/CN2015/093860 dated Feb. 25, 2016.
Office Action for RU Application No. 2016104076 dated May 15, 2017.
International Search Report for PCT/CN2015/093860.
Extended European Search Report for European Application No. 15862134.2, dated Apr. 13, 2018.

* cited by examiner

METHOD AND APPARATUS FOR CONTROLLING ACCESS TO SURVEILLANCE VIDEO

CROSS-REFERENCE TO RELATED APPLICATIONS

This application is a Continuation of International Application No. PCT/CN2015/093860 with an international filing date of Nov. 5, 2015, which is based upon and claims priority to Chinese Patent Application No. 201410804324.0, filed on Dec. 19, 2014, the entire contents of which are incorporated herein by reference.

TECHNICAL FIELD

The present disclosure relates to the field of computer technologies, and more particularly, to a method and an apparatus for controlling access to a surveillance video.

BACKGROUND

With the combination of traditional cameras and network technologies, a webcam can transmit images or video to anywhere (including the other side of the globe) through the network, so a viewer at the distal end can monitor the images via a standard Web browser (such as Microsoft IE or Netscape).

In the related art, the webcam not only may locally save a surveillance video, but also may automatically transmit the surveillance video to a network router, which is convenient for users to view the surveillance through a local area network (LAN) and make backup copies. Although this function is practical, it brings corresponding privacy issues that any user in the LAN can freely view the surveillance video stored in the router.

SUMMARY

Embodiments of the present disclosure provide a method and an apparatus for controlling access to a surveillance video.

According to a first aspect of embodiments of the present disclosure, a method for controlling access to a surveillance video is provided. The method includes: acquiring from a user account a view request for viewing a surveillance video file, the view request including authorization information of the user account; performing an identity authentication on the user account according to the authorization information; and allowing a user with the user account to view the surveillance video file when the identity authentication is passed.

In the present embodiment, an identity authentication is performed on the user who accesses the surveillance video file, and only the user who passes the identity authentication is allowed to view the surveillance video, such that the surveillance video cannot be viewed freely, thereby preventing leakage of user privacy information and effectively protecting the user's privacy.

According to a second aspect of embodiments of the present disclosure, an apparatus for controlling access to a surveillance video is provided. The apparatus includes: a processor; and a memory for storing instructions executable by the processor; wherein the processor is configured to perform: acquiring from a user account a view request for viewing a surveillance video file, the view request including authorization information of the user account; performing an identity authentication on the user account according to the authorization information; and allowing a user with the user account to view the surveillance video file when the identity authentication is passed.

According to a third aspect of embodiments of the present disclosure, a non-transitory computer-readable storage medium is provided. The non-transitory computer-readable storage medium have stored therein instructions that, when executed by one or more processors of an apparatus, cause the apparatus to perform: acquiring from a user account a view request for viewing a surveillance video file, the view request comprising authorization information of the user account; performing an identity authentication on the user account according to the authorization information; and allowing a user with the user account to view the surveillance video file when the identity authentication is passed.

It shall be appreciated that the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A surveillance video file captured by a camera device (such as a surveillance camera) is uploaded to a terminal device (e.g., a computer or a router) through a LAN. The method provided in the present disclosure mainly relates to privacy protection of the surveillance video file uploaded to the terminal device.

Figure 1:
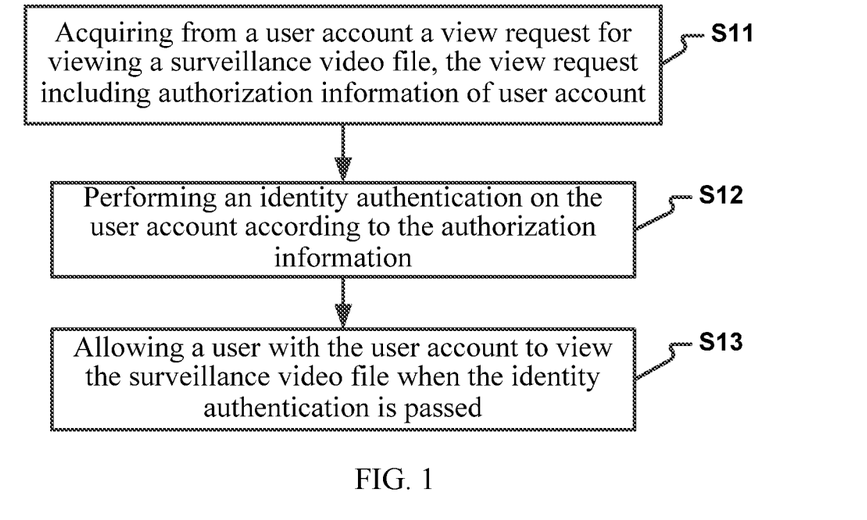
FIG. 1 is a flowchart illustrating a method for controlling access to a surveillance video according to an exemplary embodiment.

FIG. 1 is a flowchart illustrating a method for controlling access to a surveillance video according to an exemplary embodiment. As shown in FIG. 1, a camera device uploads a surveillance video file to a terminal device, such as a router. The method for controlling access to the surveillance video is applied in the terminal device, and includes the following steps.

In step S11, a view request for viewing a surveillance video file is acquired from a user account, the view request including authorization information of the user account.

In step S12, an identity authentication is performed on the user account according to the authorization information.

In step S13, the user account is allowed to view the surveillance video file when the identity authentication is passed.

In the present embodiment, an identity authentication on the user who accesses the surveillance video file is performed by the terminal device (such as the router) in the LAN, and only the user who passes the identity authentication is allowed to view the surveillance video, such that the surveillance video cannot be viewed freely by all of the potential users in the LAN, thereby preventing leakage of user privacy information contained in the surveillance video and effectively protecting the privacy of the surveillance video. Moreover, since the identity authentication can be performed in the terminal device within the LAN, a remote and complicate identity authentication implemented in a server through an Internet can be omitted.

Figure 2:
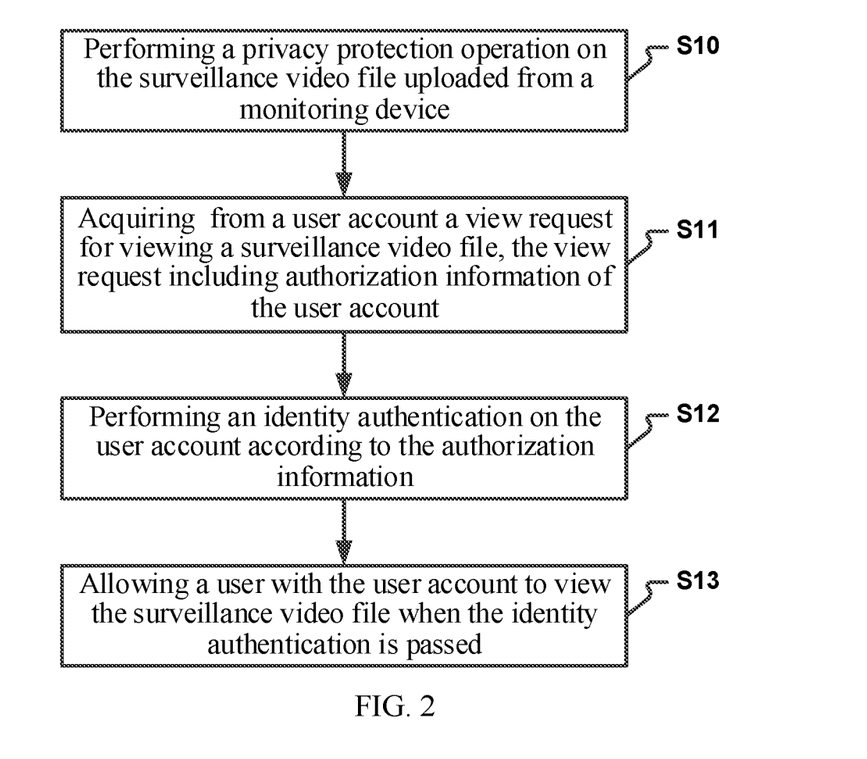
FIG. 2 is a flowchart illustrating a method for controlling access to a surveillance video according to another exemplary embodiment.

FIG. 2 is a flowchart illustrating a method for controlling access to a surveillance video according to another exemplary embodiment. As shown in FIG. 2, optionally, the method further includes the following step.

In step S10, a privacy protection operation is performed to the surveillance video file uploaded from the camera device.

In the optional solution, a privacy protection operation is performed to the surveillance video file, such that the surveillance video cannot be viewed freely, thereby preventing leakage of user privacy information contained in the surveillance video and effectively protecting the privacy of the surveillance video.

Optionally, step S10 includes at least one of the following operations: setting an attribute of the surveillance video file to be hidden; or encrypting the surveillance video file.

In the optional solution, by either being hided or being encrypted, or by combination thereof, the surveillance video file is protected, such that the surveillance video cannot be viewed freely, thereby preventing leakage of user privacy information contained in the surveillance video and effectively protecting the privacy of the surveillance video.

Figure 3:
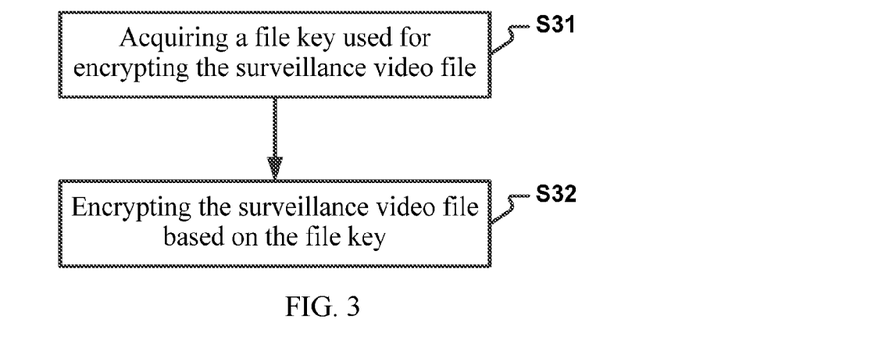
FIG. 3 is a flowchart illustrating a method for controlling access to a surveillance video according to another exemplary embodiment.

FIG. 3 is a flowchart illustrating a method for controlling access to a surveillance video according to another exemplary embodiment. As shown in FIG. 3, optionally, encrypting the surveillance video file includes the following steps.

In step S31, a file key used for encrypting the surveillance video file is acquired.

In step S32, the surveillance video file is encrypted based on the file key.

In one optional solution, the terminal device encrypts the surveillance video file using a file key preset by the owner of the camera device, such as a user password for the owner of the camera device to login the terminal device. In another optional solution, the file key used in encryption may be generated by the terminal device itself, so neither the owner of the camera device nor other users can know the file key actually used for encrypting the surveillance video file, which further guarantees the safety of the surveillance video file stored in the terminal device. All of these encrypting methods can be used for surveillance video file protection, which make the surveillance video cannot be viewed freely, thereby preventing leakage of user privacy information contained in the surveillance video and effectively protecting the privacy of the surveillance video. Moreover, since the identity authentication can be performed in the terminal device within the LAN, a remote and complicate identity authentication implemented in a server through an Internet can be omitted.

Optionally, the method further includes: distributing the file key to a preset user account.

In the optional solution, the owner of the camera device may preset user accounts that are authorized to access the surveillance video file, and the terminal device distributes the file key to such users, such that these users may view the surveillance video file. As such, only the users who have access authorization are allowed to view the surveillance video file stored in the terminal device, which effectively protects the privacy of the surveillance video.

Figure 4:
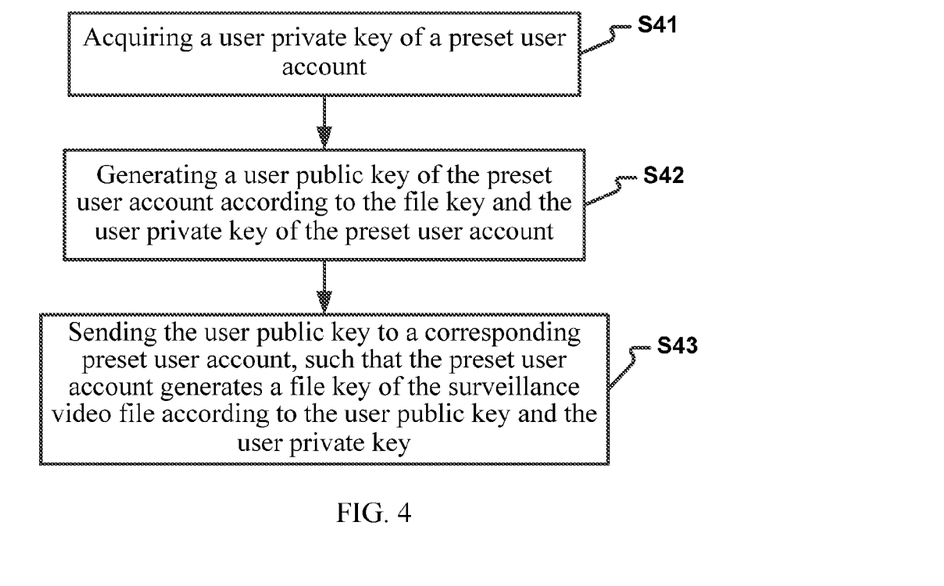
FIG. 4 is a flowchart illustrating a method for controlling access to a surveillance video according to another exemplary embodiment.

FIG. 4 is a flowchart illustrating a method for controlling access to a surveillance video according to another exemplary embodiment. As shown in FIG. 4, optionally, the method further includes the following steps.

In step S41, a user private key of a preset user account is acquired.

In step S42, a user public key of the preset user account is generated according to the file key and the user private key of the preset user account;

In step S43, the user public key is sent to a corresponding preset user account, such that a file key of the surveillance video file is generated by the preset user account according to the user public key and the user private key.

In the optional solution, based on the RSA (Rivest-Shamir-Adleman) public-key crypto system, the terminal device generates a public key for the preset user account according to the private key of the preset user account and the key for encrypting the files; other users may calculate the key for encrypting the files according to the public key and their own private keys. Therefore, these users may access the video file stored on the terminal device. By this encrypting manner, the key for encrypting the files is not required to be made public; meanwhile, although the key for encrypting the files is specific, private keys of respective preset user accounts may be different from each other, so that public keys generated by the terminal device for respective user accounts are different from each other; thus, even if public keys of respective user accounts are published, the key for encrypting the files cannot be obtained by other people, thereby further enhancing safety of the key for encrypting the files, enhancing safety of the surveillance video files, and more effectively protecting the privacy of the surveillance video.

Figure 5:
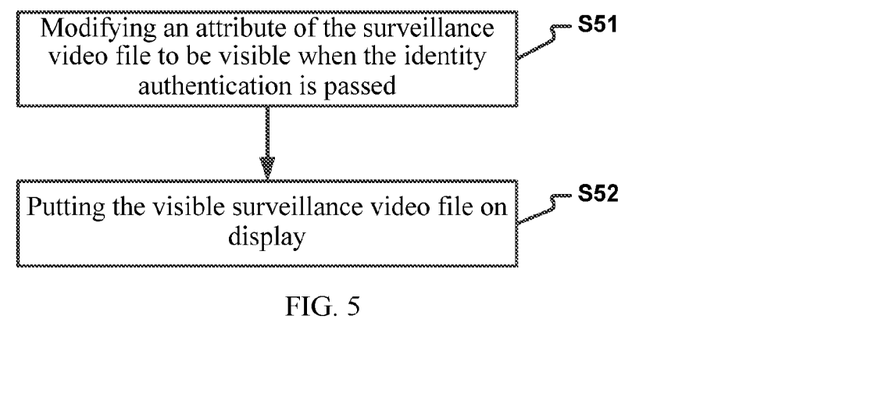
FIG. 5 is a flowchart illustrating a method for controlling access to a surveillance video according to another exemplary embodiment.

FIG. 5 is a flowchart illustrating a method for controlling access to a surveillance video according to another exemplary embodiment. As shown in FIG. 5, optionally, when attributes of the surveillance video file are set to be hidden, the step S13 includes the following steps.

In step S51, attributes of the surveillance video file are modified to be visible when the identity authentication is passed.

In step S52, the visible surveillance video file is put on display.

In the optional solution, when the user's identity authentication is passed, the terminal device modifies hidden attributes of the surveillance video file to be visible, so that the user who passes the identity authentication is allowed to access the surveillance video file, thereby achieving protection of the surveillance video file. By this means, the surveillance video cannot be viewed freely, thereby preventing leakage of user privacy information and effectively protecting the privacy of the surveillance video. Moreover, since the identity authentication can be performed in the terminal device within the LAN, a remote and complicate identity authentication implemented in a server through an Internet can be omitted.

Figure 6:
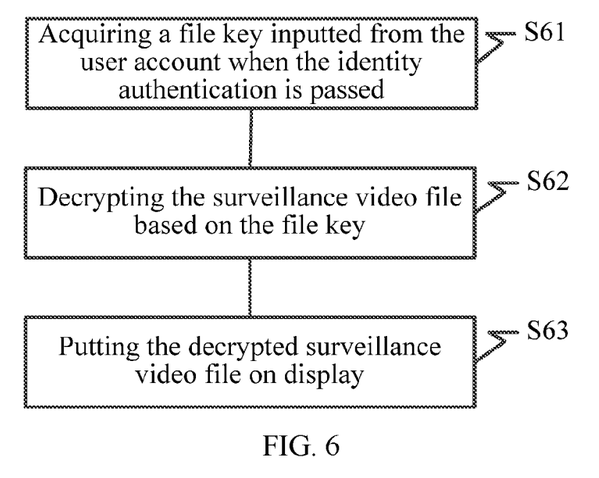
FIG. 6 is a flowchart illustrating a method for controlling access to a surveillance video according to another exemplary embodiment.

FIG. 6 is a flowchart illustrating a method for controlling access to a surveillance video according to another exemplary embodiment. As shown in FIG. 6, optionally, when the surveillance video file is encrypted, the step S13 includes the following steps.

In step S61, a file key inputted from a user with the user account is acquired when the identity authentication is passed.

In step S62, the surveillance video file is decrypted based on the file key;

In step S63, the decrypted surveillance video file is put on display.

In the optional solution, when the user's identity authentication is passed, the terminal device prompts the user to input the file key so as to decrypt the surveillance video file and display it to the user, which achieves protection on the surveillance video file, such that the surveillance video cannot be viewed freely, thereby preventing leakage of user privacy information contained in the surveillance video and effectively protecting the privacy of the surveillance video.

Figure 7:
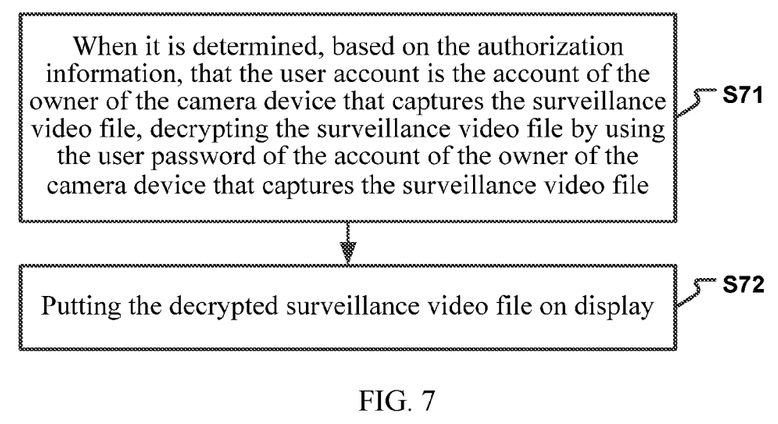
FIG. 7 is a flowchart illustrating a method for controlling access to a surveillance video according to another exemplary embodiment.

FIG. 7 is a flowchart illustrating a method for controlling access to a surveillance video according to another exemplary embodiment. As shown in FIG. 7, optionally, the file key is a user password of an account of the owner of the camera device that captures the surveillance video file, and the authorization information includes a user name and a user password of the user account, and the step S13 includes the following steps.

In step S71, when it is determined, based on the authorization information, that the user with the user account is the owner of the camera device that captures the surveillance video file, the surveillance video file is decrypted by the user password of the account of the owner of the camera device that captures the surveillance video file.

In step S72, the decrypted surveillance video file is put on display.

In the optional solution, when the owner of the camera device encrypts the surveillance video file by using the user password of his/her own account, if an accessor is determined to be the owner of the camera device during identity authentication, the surveillance video file is directly decrypted for the user, such that the owner of the camera device may conveniently and quickly access the surveillance video file.

Figure 8:
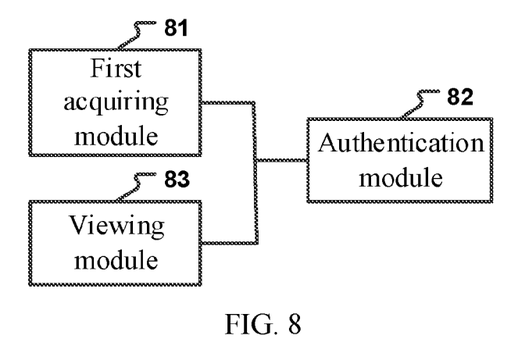
FIG. 8 is a block diagram illustrating an apparatus for controlling access to a surveillance video according to an exemplary embodiment.

FIG. 8 is a block diagram illustrating an apparatus for controlling access to a surveillance video according to an exemplary embodiment. As shown in FIG. 8, the apparatus includes a first acquiring module 81, an authentication module 82 and a viewing module 83.

The first acquiring module 81 is configured to acquire from a user account a view request for viewing a surveillance video file, the view request including authorization information of the user account.

The authentication module 82 is configured to perform an identity authentication on the user account according to the authorization information.

The viewing module 83 is configured to allow a user with the user account to view the surveillance video file when the identity authentication is passed.

Figure 9:
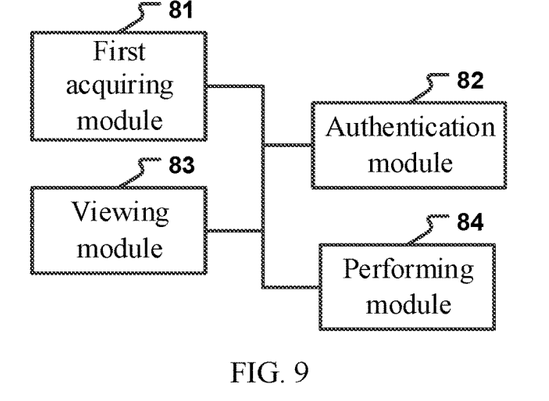
FIG. 9 is a block diagram illustrating an apparatus for controlling access to a surveillance video according to another exemplary embodiment.

FIG. 9 is a block diagram illustrating an apparatus for controlling access to a surveillance video according to another exemplary embodiment. As shown in FIG. 9, optionally, the apparatus further includes: a performing module 84 configured to perform a privacy protection operation on the surveillance video file uploaded from a camera device.

Figure 10:
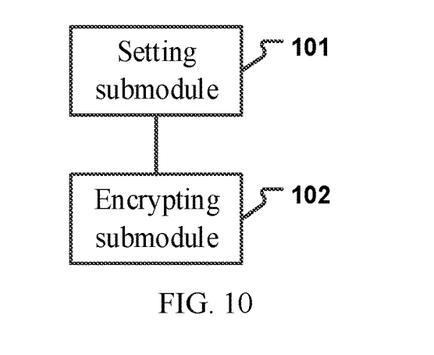
FIG. 10 is a block diagram illustrating a performing module according to an exemplary embodiment.

FIG. 10 is a block diagram illustrating a performing module according to an exemplary embodiment. As shown in FIG. 10, optionally, the performing module 84 includes at least one of the following submodule: a setting submodule 101 configured to set attributes of the surveillance video file to be hidden; and an encrypting submodule 102 configured to encrypt the surveillance video file.

Optionally, the encrypting submodule 102 is configured to acquire a file key used for encrypting the surveillance video file and encrypt the surveillance video file based on the file key.

Figure 11:
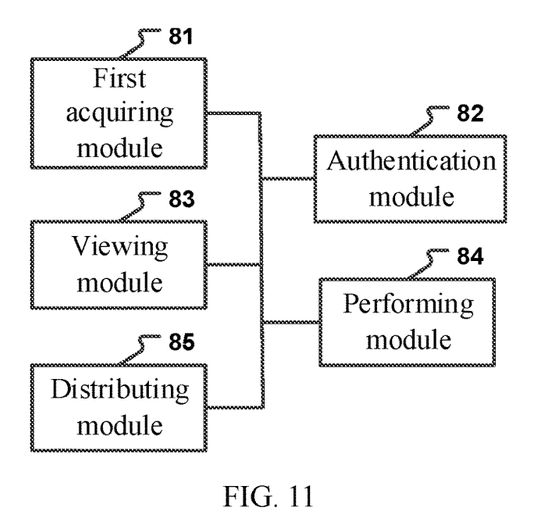
FIG. 11 is a block diagram illustrating an apparatus for controlling access to a surveillance video according to another exemplary embodiment.

FIG. 11 is a block diagram illustrating an apparatus for controlling access to a surveillance video according to another exemplary embodiment. As shown in FIG. 11, optionally, the apparatus further includes: a distributing module 85 configured to distribute the file key to a preset user account.

Figure 12:
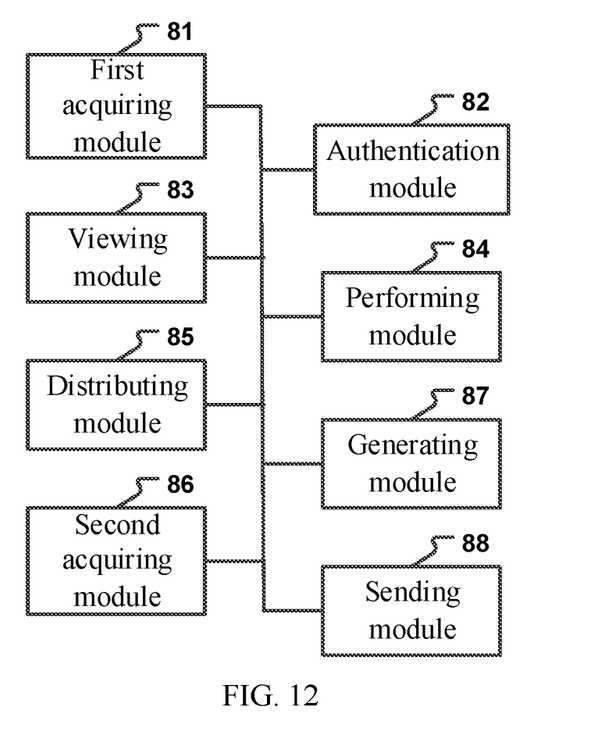
FIG. 12 is a block diagram illustrating an apparatus for controlling access to a surveillance video according to another exemplary embodiment.

FIG. 12 is a block diagram illustrating an apparatus for controlling access to a surveillance video according to another exemplary embodiment. As shown in FIG. 12, optionally, the apparatus further includes: a second acquiring module 86 configured to acquire a user private key of a preset user account; a generating module 87 configured to generate a user public key of the preset user account according to the file key and the user private key of the preset user account; and a sending module 88 configured to send the user public key to a corresponding preset user account, such that the preset user account generates a file key of the surveillance video file according to the user public key and the user private key.

Figure 13:
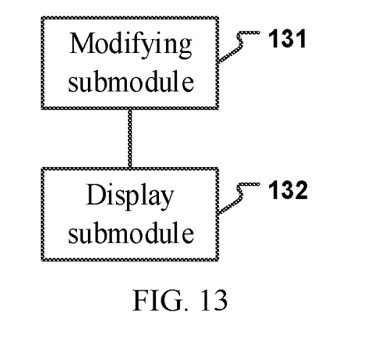
FIG. 13 is a block diagram illustrating a viewing module according to an exemplary embodiment.

FIG. 13 is a block diagram illustrating a viewing module according to an exemplary embodiment. As shown in FIG. 13, optionally, the viewing module 83 includes: a modifying submodule 131 configured to, when attributes of the surveillance video file are set to be hidden, modify attributes of the surveillance video file to be visible when the identity authentication is passed; and a display submodule 132 configured to put the visible surveillance video file on display.

Figure 14:
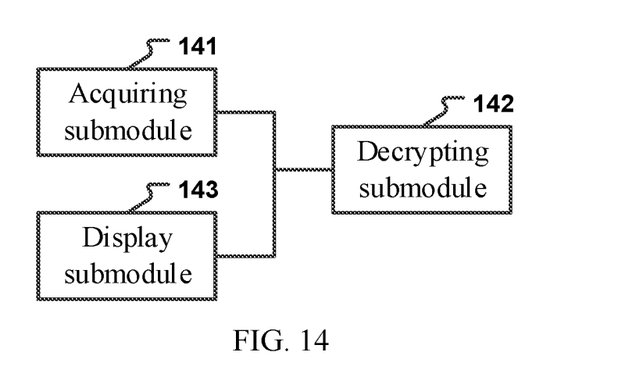
FIG. 14 is a block diagram illustrating a viewing module according to another exemplary embodiment.

FIG. 14 is a block diagram illustrating a viewing module according to another exemplary embodiment. As shown in FIG. 14, optionally, the viewing module 83 includes: an acquiring submodule 141 configured to, when the surveillance video file is encrypted, acquire a file key inputted from the user account when the identity authentication is passed; a decrypting submodule 142, configured to decrypt the surveillance video file based on the file key; and a display submodule 143, configured to put the decrypted surveillance video file on display.

Figure 15:
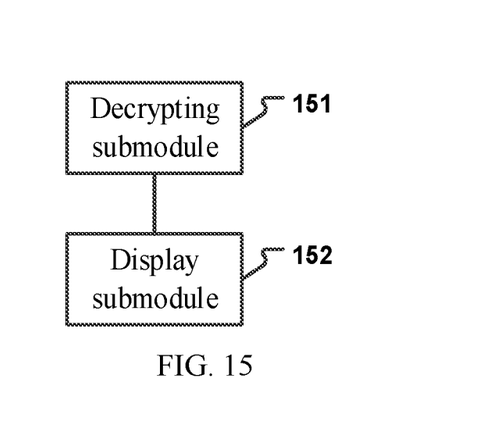
FIG. 15 is a block diagram illustrating a viewing module according to another exemplary embodiment.

FIG. 15 is a block diagram illustrating a viewing module according to another exemplary embodiment. As shown in FIG. 15, optionally, the file key is a user password of an account of the owner of the camera device that captures the surveillance video file, and the authorization information includes a user name and a user password of the user account; and the viewing module 83 includes:

a decrypting submodule 151, configured to, when it is determined based on the authorization information that the user with the user account is the owner of the camera device that captures the surveillance video file, decrypt the surveillance video file by using the user password of the account of the owner of the camera device that captures the surveillance video file; and a display submodule 152, configured to put the decrypted surveillance video file on display.

With respect to the apparatuses in the above embodiments, the specific implementations of operations executed by various modules thereof have been described in detail in the embodiments illustrating the methods, which are not described herein any further.

The present disclosure further provides an apparatus for controlling access to a surveillance video, including: a processor; and a memory for storing instructions executable by the processor; wherein the processor is configured to perform: acquiring from a user account a view request for viewing a surveillance video file, the view request including authorization information of the user account; performing an identity authentication on the user account according to the authorization information; and allowing the user with the user account to view the surveillance video file when the identity authentication is passed.

Figure 16:
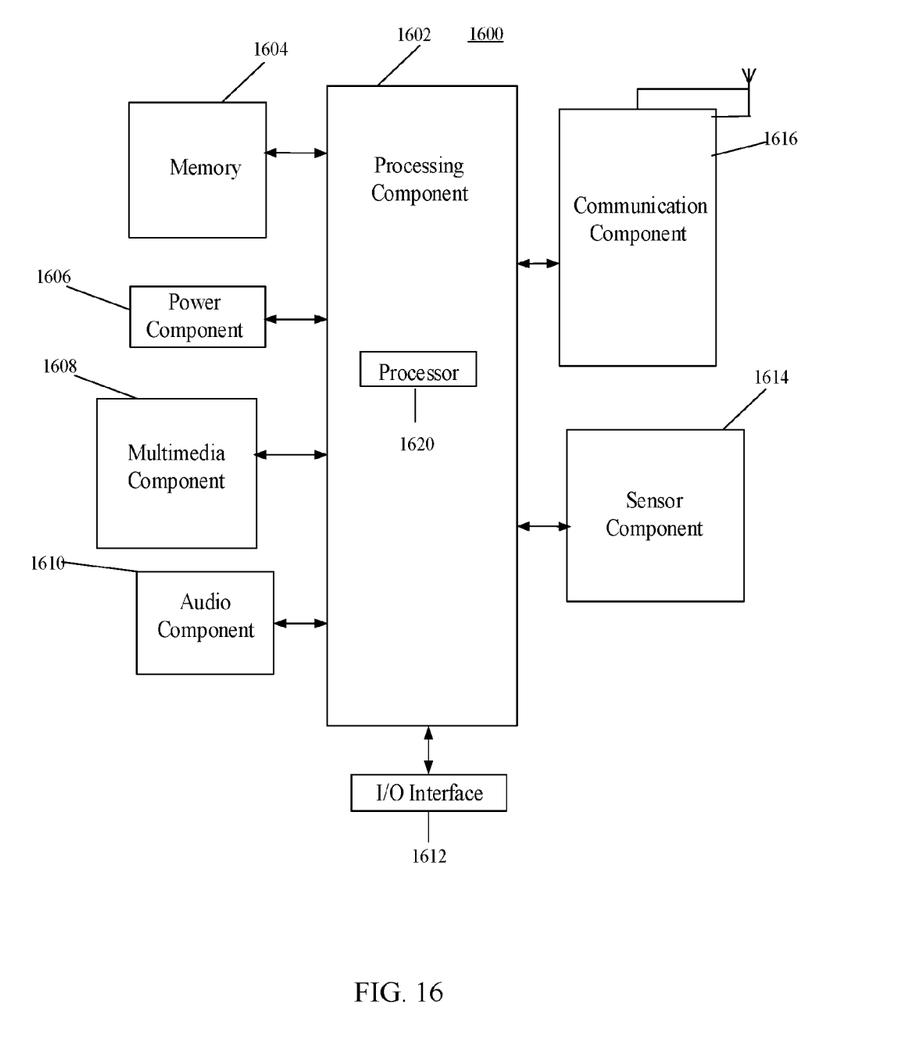
FIG. 16 is a block diagram illustrating an apparatus for controlling access to a surveillance video according to an exemplary embodiment.

FIG. 16 is a block diagram illustrating an apparatus for controlling access to a surveillance video according to an exemplary embodiment. For example, the apparatus 1600 may be a mobile phone, a computer, a digital broadcast terminal device, a messaging device, a gaming console, a tablet, a medical device, exercise equipment, a personal digital assistant, and the like.

Referring to FIG. 16, the apparatus 1600 may include one or more of the following components: a controlling access to component 1602, a memory 1604, a power component 1606, a multimedia component 1608, an audio component 1610, an input/output (I/O) interface 1612, a sensor component 1614, and a communication component 1616.

The controlling access to component 1602 typically controls overall operations of the apparatus 1600, such as the operations associated with display, telephone calls, data communications, camera operations, and recording operations. The controlling access to component 1602 may include one or more processors 1620 to execute instructions to perform all or a part of the steps in the above-described methods. In addition, the controlling access to component 1602 may include one or more modules which facilitate the interaction between the controlling access to component 1602 and other components. For example, the controlling access to component 1602 may include a multimedia module to facilitate the interaction between the multimedia component 1608 and the controlling access to component 1602.

The memory 1604 is configured to store various types of data to support the operations of the apparatus 1600. Examples of such data include instructions for any application or method operated on the apparatus 1600, contact data, phonebook data, messages, pictures, videos, and the like. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 provides power to various components of the apparatus 1600. The power component 1606 may include a power management system, one or more power supplies, and other components associated with the generation, management, and distribution of power in the apparatus 1600.

The multimedia component 1608 includes a screen providing an output interface between the apparatus 1600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. The front camera and/or the rear camera may receive external multimedia data while the apparatus 1600 is in an operation mode, such as a photographing mode or a video mode. Each of the front camera and the rear camera may be a fixed optical lens system or have focus and optical zoom capability.

The audio component 1610 is configured to output and/or input audio signals. For example, the audio component 1610 includes a microphone (MIC) configured to receive an external audio signal when the apparatus 1600 is in an operation mode, such as a call mode, a recording mode, or a voice recognition mode. The received audio signal may be further stored in the memory 1604 or transmitted via the communication component 1616. In some embodiments, the audio component 1610 further includes a speaker to output audio signals.

The I/O interface 1612 provides an interface between the controlling access to component 1602 and a peripheral interface module, such as a keyboard, a click wheel, a button, or the like. The buttons may include, but are not limited to, a home button, a volume button, a starting button, and a locking button.

The sensor component 1614 includes one or more sensors to provide status assessments of various aspects of the apparatus 1600. For example, the sensor component 1614 may detect an open/closed status of the apparatus 1600, relative positioning of components, e.g., the display and the keypad, of the apparatus 1600, a change in position of the apparatus 1600 or a component of the apparatus 1600, a presence or absence of user contact with the apparatus 1600, an orientation or an acceleration/deceleration of the apparatus 1600, and a change in temperature of the apparatus 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an accelerometer sensor, a gyroscope sensor, a magnetic sensor, a pressure sensor, or a temperature sensor.

The communication component 1616 is configured to facilitate communications, wired or wirelessly, between the apparatus 1600 and other devices. The apparatus 1600 may access a wireless network based on a communication standard, such as WiFi, 2G, or 3G, or a combination thereof. In one exemplary embodiment, the communication component 1616 receives a broadcast signal or broadcast associated notification information from an external broadcast management system via a broadcast channel. In one exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1600 may be implemented with one or more application specific integrated circuits (ASICs), digital signal processors (DSPs), digital signal controlling access to devices (DSPDs), programmable logic devices (PLDs), field programmable gate arrays (FPGAs), controllers, micro-controllers, microprocessors, or other electronic components, for performing the above-described methods.

Figure 17:
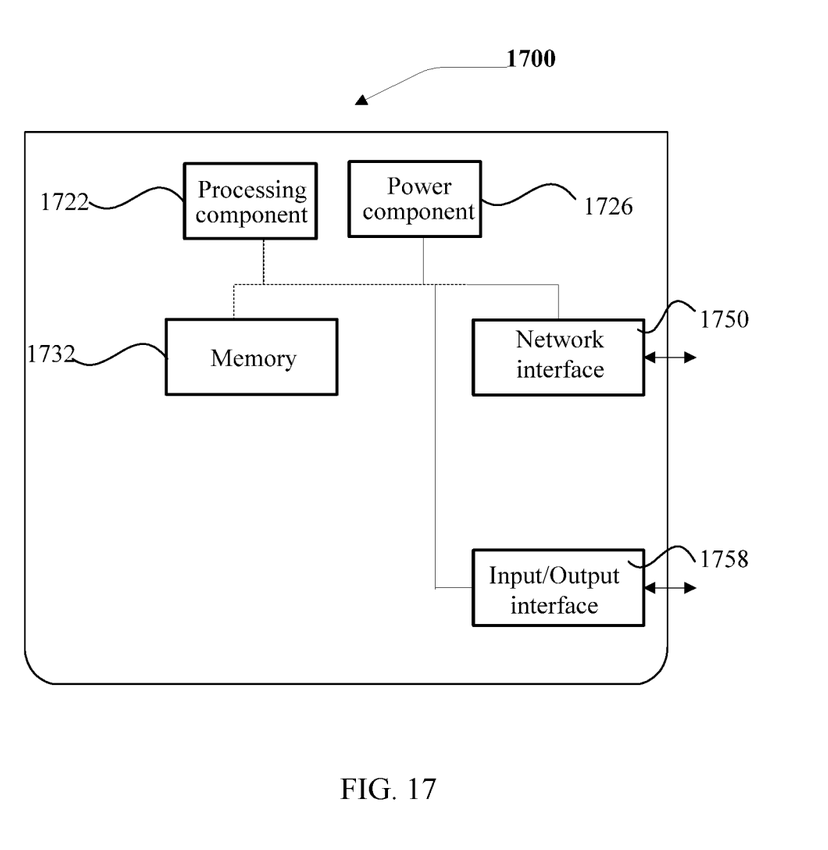
FIG. 17 is a block diagram illustrating an apparatus for controlling access to a surveillance video according to an exemplary embodiment.

FIG. 17 is a block diagram illustrating another apparatus for controlling access to a surveillance video according to an exemplary embodiment. For example, the apparatus 1700 may be provided as a router. Referring to FIG. 17, the apparatus 1700 includes a controlling access to component 1722 which further includes one or more processors, and memory resources represented by a memory 1732, configured to store instructions executable by the controlling access to component 1722, for example, applications. The applications stored in the memory 1732 may include one or more than one module each corresponding to a group of instructions. In addition, the controlling access to component 1722 is configured to execute the instructions, to perform the above methods.

The apparatus 1700 may further include: a power component 1726, configured to perform power management in the apparatus 1700; a wired or wireless network interface 1750, configured to connect the apparatus 1700 to the network; and an input/output (I/O) interface 1758. The apparatus 1700 may operate an operating system stored in the memory 1732, for example, Windows Server™, Mac OS X™, Unix™, Linux™, FreeBSD™, or the like.

In exemplary embodiments, there is also provided a non-transitory computer-readable storage medium including instructions, such as included in the memory, executable by the processor in the apparatus, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

There is provided a non-transitory computer-readable storage medium including instructions which, when being executed by a processor of a terminal device such as a computer or a router, cause the terminal device to perform a method for controlling access to a surveillance video, the method including: acquiring from a user account a view request for viewing a surveillance video file, the view request including authorization information of the user account; performing an identity authentication on the user account according to the authorization information; and allowing a user with the user account to view the surveillance video file when the identity authentication is passed.

In the present embodiment, an identity authentication is performed on the user who accesses the surveillance video file, and only the user who passes the identity authentication is allowed to view the surveillance video, such that the surveillance video cannot be viewed freely, thereby preventing leakage of user privacy information contained in the surveillance video and effectively protecting the privacy of the surveillance video. Moreover, since the identity authentication can be performed in the terminal device within the LAN, a remote and complicate identity authentication implemented in a server through an Internet can be omitted.

Optionally, the method further includes: performing a privacy protection operation on the surveillance video file uploaded from a camera device.

In the optional solution, a privacy protection operation is performed on the surveillance video file, such that the surveillance video cannot be viewed freely, thereby preventing leakage of user privacy information contained in the surveillance video and effectively protecting the privacy of the surveillance video.

Optionally, said performing a privacy protection operation on the surveillance video file uploaded from a camera device includes at least one of the following operations: setting attributes of the surveillance video file to be hidden; and encrypting the surveillance video file.

In the optional solution, by either hiding the surveillance video file or encrypting the surveillance video file, or by combination thereof, the surveillance video file is protected, such that the surveillance video cannot be viewed freely, thereby preventing leakage of user privacy information contained in the surveillance video and effectively protecting the privacy of the surveillance video.

Optionally, said encrypting the surveillance video file includes: acquiring a file key used for encrypting the surveillance video file; and encrypting the surveillance video file based on the file key.

Optionally, the method further includes: distributing the file key to a preset user account.

Optionally, the method further includes: acquiring a user private key of a preset user account; generating a user public key of the preset user account according to the file key and the user private key of the preset user account; and sending the user public key to a corresponding preset user account, such that the preset user account generates a file key of the surveillance video file according to the user public key and the user private key.

Optionally, when attributes of the surveillance video file are set to be hidden, said allowing the user with the user account to view the surveillance video file when the identity authentication is passed includes: modifying attributes of the surveillance video file to be visible when the identity authentication is passed; and putting the visible surveillance video file on display.

Optionally, when the surveillance video file is encrypted, said allowing the user with the user account to view the surveillance video file when the identity authentication is passed includes: acquiring a file key inputted from the user account when the identity authentication is passed; decrypting the surveillance video file based on the file key; and putting the decrypted surveillance video file on display.

Optionally, the file key is a user password of an account of the owner of the camera device that captures the surveillance video file, and the authorization information includes a user name and a user password of the user account; and said allowing the user with the user account to view the surveillance video file when the identity authentication is passed includes: when it is determined, based on the authorization information, that the user with the user account is the owner of the camera device that captures the surveillance video file, decrypting the surveillance video file by using the user password of the account of the owner of the camera device that captures the surveillance video file; and putting the decrypted surveillance video file on display.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for controlling access to a surveillance video, comprising:
   acquiring from a user account a view request for viewing a surveillance video file, the view request comprising authorization information of the user account;
   performing an identity authentication on the user account according to the authorization information;
   allowing a user with the user account to view the surveillance video file when the identity authentication is passed; and
   performing a privacy protection operation on the surveillance video file uploaded from a camera device;
   wherein said performing a privacy protection operation on the surveillance video file uploaded from a camera device comprises at least one of the following operations:
   setting an attribute of the surveillance video file to be hidden; and
   encrypting the surveillance video file;
   wherein said encrypting the surveillance video file comprises:
   acquiring a file key used for encrypting the surveillance video file;
   encrypting the surveillance video file based on the file key;
   wherein when the surveillance video file is encrypted, the method further comprises:
   acquiring a user private key of a preset user account;
   generating a user public key of the preset user account according to the file key and the user private key of the preset user account; and
   sending the user public key to a corresponding preset user account, such that the preset user account generates a file key of the surveillance video file according to the user public key and the user private key.

2. The method according to claim 1, wherein when the attribute of the surveillance video file is set to be hidden, said allowing the user with the user account to view the surveillance video file when the identity authentication is passed comprises:
   modifying the attribute of the surveillance video file to be visible when the identity authentication is passed; and
   putting the visible surveillance video file on display.

3. The method according to claim 1, wherein when the surveillance video file is encrypted, said allowing the user with the user account to view the surveillance video file when the identity authentication is passed comprises:
   acquiring a file key inputted from the user with the user account when the identity authentication is passed;
   decrypting the surveillance video file based on the file key; and
   putting the decrypted surveillance video file on display.

4. An apparatus for controlling access to a surveillance video, comprising:
   one or more hardware processors;
   a memory; and
   one or more modules stored in the memory and being configured to be executed by the one or more hardware processors, the one or more modules having the following functions:
   acquiring from a user account a view request for viewing a surveillance video file, the view request comprising authorization information of the user account;
   performing an identity authentication on the user account according to the authorization information;
   allowing a user with the user account to view the surveillance video file when the identity authentication is passed; and
   performing a privacy protection operation on the surveillance video file uploaded from a camera device;
   wherein said performing a privacy protection operation on the surveillance video file uploaded from a camera device comprises at least one of the following operations:
   setting an attribute of the surveillance video file to be hidden; and
   encrypting the surveillance video file;
   wherein said encrypting the surveillance video file comprises:
   acquiring a file key used for encrypting the surveillance video file;
   encrypting the surveillance video file based on the file key;
   wherein when the surveillance video file is encrypted, the one or more modules further have the following functions:

acquiring a user private key of a preset user account;

generating a user public key of the preset user account according to the file key and the user private key of the preset user account; and sending the user public key to a corresponding preset user account, such that the preset user account generates a file key of the surveillance video file according to the user public key and the user private key.

5. The apparatus according to claim 4, wherein when an attribute of the surveillance video file is set to be hidden, the one or more modules further have the following functions:

modifying the attribute of the surveillance video file to be visible when the identity authentication is passed; and putting the visible surveillance video file on display.

6. The apparatus according to claim 4, wherein when the surveillance video file is encrypted, the one or more modules further have the following functions:

acquiring a file key inputted from the user with the user account when the identity authentication is passed;

decrypting the surveillance video file based on the file key; and putting the decrypted surveillance video file on display.

7. A non-transitory computer-readable storage medium having stored therein instructions that, when executed by one or more hardware processors of an apparatus, cause the apparatus to perform:

acquiring from a user account a view request for viewing a surveillance video file, the view request comprising authorization information of the user account;

performing an identity authentication on the user account according to the authorization information;

allowing a user with the user account to view the surveillance video file when the identity authentication is passed; and performing a privacy protection operation on the surveillance video file uploaded from a camera device;

wherein said performing a privacy protection operation on the surveillance video file uploaded from a camera device comprises at least one of the following operations:

setting an attribute of the surveillance video file to be hidden; and encrypting the surveillance video file;

wherein said encrypting the surveillance video file comprises:

acquiring a file key used for encrypting the surveillance video file;

encrypting the surveillance video file based on the file key;

wherein when the surveillance video file is encrypted, the instructions further cause the apparatus to perform:

acquiring a user private key of a preset user account;

generating a user public key of the preset user account according to the file key and the user private key of the preset user account; and sending the user public key to a corresponding preset user account, such that the preset user account generates a file key of the surveillance video file according to the user public key and the user private key.

* * * * *